United States Patent [19]

Erikson et al.

[11] Patent Number: 4,974,464
[45] Date of Patent: Dec. 4, 1990

[54] MOTORIZED ANTI-BACKLASH LINEAR ACTUATOR

[76] Inventors: Kenneth W. Erikson, 30 Walnut Hill Rd., Amherst, N.H. 03031; Keith W. Erikson, 267 Farley Rd., Hollis, N.H. 03049

[21] Appl. No.: 378,453

[22] Filed: Jul. 11, 1989

Related U.S. Application Data

[63] Continuation of Ser. No. 169,379, Mar. 17, 1988, abandoned.

[51] Int. Cl.⁵ ............................................. F16H 19/02
[52] U.S. Cl. ........................................ 74/89.15; 74/409
[58] Field of Search .............................. 74/409, 89.15

[56] References Cited

U.S. PATENT DOCUMENTS

| | | | |
|---|---|---|---|
| Re. 32,433 | 6/1987 | Erikson et al. | 74/441 |
| 2,446,393 | 8/1948 | Russell | 74/459 |
| 2,966,072 | 12/1960 | Wise | 74/409 |
| 4,019,616 | 4/1977 | Thorne | 74/89.15 |
| 4,131,031 | 12/1978 | Erikson et al. | 74/441 |
| 4,210,033 | 7/1980 | Erikson et al. | 74/424.8 A |
| 4,279,173 | 7/1981 | Krebs et al. | 74/441 |
| 4,353,264 | 10/1982 | Erikson et al. | 74/441 |
| 4,433,590 | 2/1984 | Benoit et al. | 74/409 |
| 4,434,677 | 3/1984 | Linley, Jr. | 74/409 |

Primary Examiner—Leslie A. Braun
Assistant Examiner—Scott Anchell
Attorney, Agent, or Firm—Hamilton, Brook, Smith & Reynolds

[57] ABSTRACT

A motorized anti-backlash actuator having an externally threaded rod (18) movable linearly while in rotational engagement with an inwardly threaded anti-backlash nut portion (10) and an armature (8) fixed to the nut and rotatable therewith. A field coil (4) (6) surrounds the armature (8) to excite it to impart anti-backlash linear motion to the rod.

4 Claims, 2 Drawing Sheets

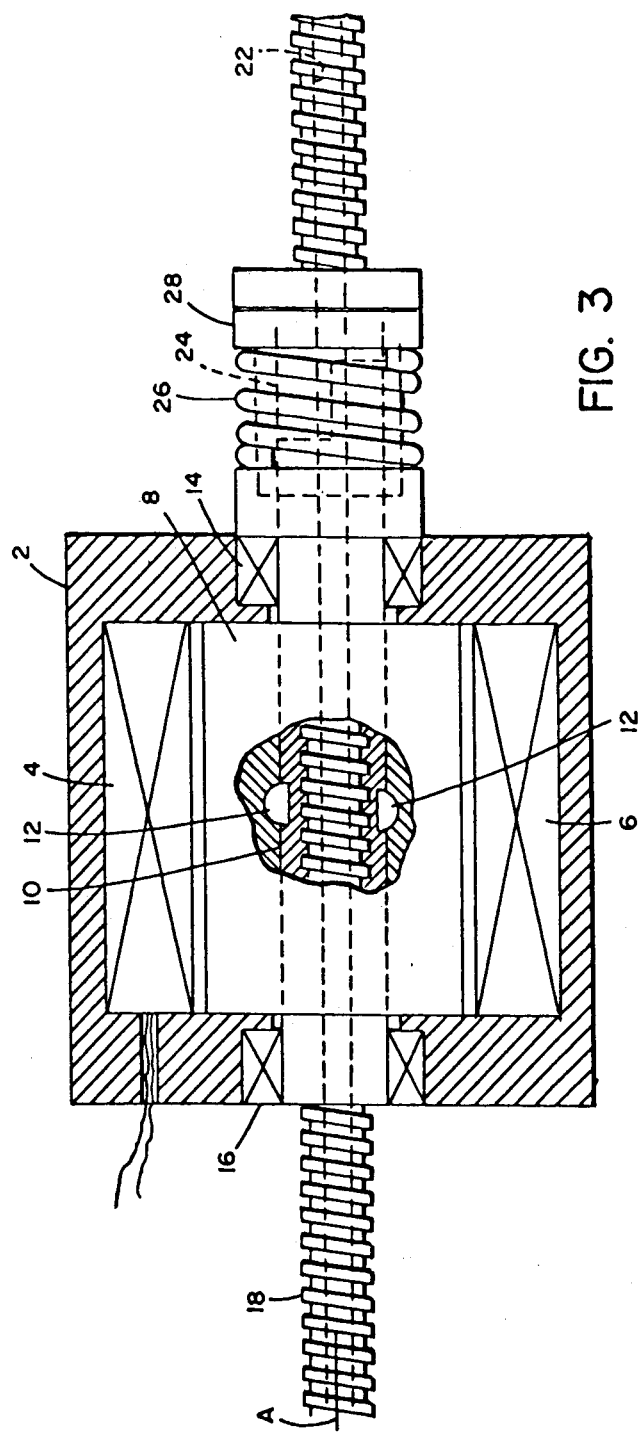

MOTORIZED ANTI-BACKLASH LINEAR ACTUATOR

This is a continuation of co-pending application Ser. No. 07/169,379 filed on Mar. 17, 1988.

FIELD OF THE INVENTION

This invention relates motorized anti-backlash linear actuators in general, and more particularly to anti-backlash mechanisms which are integral with motor drives for effecting anti-backlash linear actuation.

BACKGROUND OF THE INVENTION

Anti-backlash nuts, per se, are commercially available today in many forms and sizes. One of their important uses is to drive an element of a machine in a linear path with accurate positional repeatability and constant drag torque control in both the forward and reverse directions. For example, data printers and XY tables, used as peripheral equipment in the computer industry, have such requirements. Generally speaking, the anti-backlash nut is a nonrotatable member physically attached to a machine element. It is driven linearly in both forward and reverse directions by the rotation of a lead screw to which it is threadably attached. Such anti-backlash mechanisms will be found in our earlier U.S. Pat. Nos. 4,131,031, 4,249,426 and RE 32,433. We have found that such mechanisms are ideal for the creation of anti-backlash linear motion, not of the nut, per se, but of the lead screw which heretofore drove the nut.

There are numerous requirements today for very accurate linear reciprocation, as for example, a piston of pumping mechanism for chemical or medical analysis apparatus. Accuracy is also required in raising and lowering of apparatus in a predictable and repeatable sequence in robotic applications.

It is an object of this invention to produce mechanisms for creating motorized anti-backlash linear motion having the highest degree of accuracy and simultaneously reducing the amount of supplemental mechanism heretofore found necessary in the prior art.

SUMMARY OF THE INVENTION

The invention resides in a motorized anti-backlash linear actuator which includes an externally threaded member in the form of a rod which reciprocates linearly but which does not rotate. An inwardly threaded member is in rotational engagement with the externally threaded rod. The inwardly threaded member is one part of an anti-backlash mechanism which includes means for compensating for wear between the inwardly and outwardly threaded members, that is, between the portion of the mechanism which engages the rod and the threaded rod itself. A motor armature is fixed to or integrated with the inwardly threaded member or the portion of the anti-backlash mechanism.

A field coil for exciting the armature causes it to rotate either contiguously or in steps. The inwardly threaded member, i.e., one portion of the anti-backlash mechanism which engages the rod and the armature and the wear compensating portion of the anti-backlash mechanism are secured to each other for rotation as a unit. When they rotate as a unit, but do not translate linearly, the rod is caused to move linearly without rotating. The armature and the anti-backlash mechanism are maintained stationary in a motor housing which includes the field and the armature.

In one embodiment of the invention, at least a portion of the anti-backlash mechanism, or inwardly threaded member, is inside the armature and fixed thereto to prevent rotation. However, it will be understood that the entire anti-backlash mechanism may be enclosed within the motor housing, if, for example, the mechanism is intended to operate in an unclean environment. The motor housing includes means for journaling the anti-backlash mechanism and the armature for rotation as a unit.

The above and other features of the invention including various novel details of construction and combinations of parts will now be more particularly described with reference to the accompanying drawings and pointed out in the claims. It will be understood that the particular motorized anti-backlash linear actuator embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 3 is a sectional elevation, with parts broken away, of a motorized anti-backlash linear actuator made in accordance with the present invention.

DETAILED DESCRIPTION OF THE INVENTION

Figure 1:
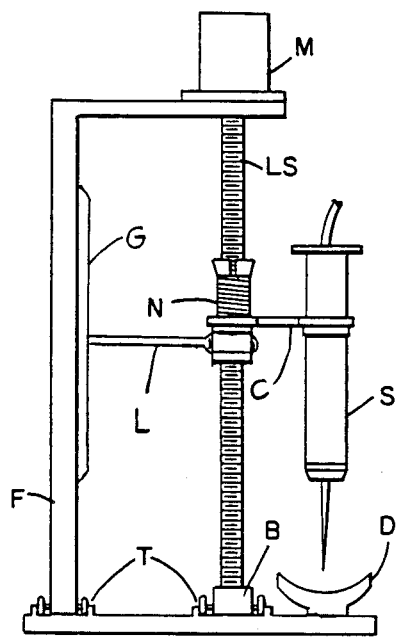
FIG. 1 is a schematic showing of a prior art device for effecting linear motion.

FIG. 1 is illustrative of a piece of present-day laboratory equipment which includes a syringe S for putting liquid into and taking it out of a petri dish D or a series of petri dishes which are positioned one behind the other into the plane of the figure. The syringe is clamped to an anti-backlash nut N and moves upwardly and downwardly as a lead screw LS is rotated by a motor M. The clamp C which attaches the anti-backlash nut to the syringe may be independent of or a movable part of a frame F that supports the motor M. For example, a link L may be mounted in a guide G to prevent the syringe from rotating. The frame F moves linearly in a direction into and out of the plane of the figure in a track T. The lower end of the lead screw LS is journaled in a bearing B also in a track T.

The frame F and the bearing B move in a direction toward and away from the viewer so that the syringe can sequentially add or remove liquid from a series of petri dishes D or test tubes.

Figure 2:
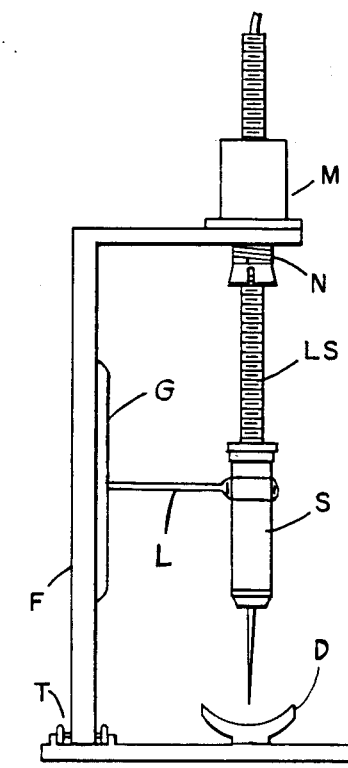
FIG. 2 is a schematic showing of an apparatus employing a motorized anti-backlash linear actuator made in accordance with the present invention.

By use of apparatus made in accordance with the present invention, the bearing B and its track T may be eliminated as well as the clamp, as seen in FIG. 2. Note that the syringe can be attached directly to the, now, nonrotating lead screw which may serve to feed the syringe if it is made hollow.

The invention will now be specifically described with reference to FIG. 3. A motorized anti-backlash linear actuator includes a motor housing 2 in which there are stationary field coils 4 and 6 for exciting a rotatable armature 8. The armature is firmly attached to a part of a hollow shaft 10. It may be secured by any conventional means, as for example, mechanical means such as woodriff keys 12, adhesive means, or interfering means such as a press fit, and the like. The shaft 10 is journaled in bearing 14 and 16 which are mounted in the motor housing 2.

The interior of the shaft 10 is, at least partially, inwardly threaded and is in threadable engagement with an externally threaded rod 18 the center of which occupies an axis A, which is also the axis of rotation of the armature 8. It will be noted that the threaded rod 18 may be hollow as shown at 22 whereby it can, if desired, transmit fluid or be a conduit for wiring, etc. The inwardly threaded shaft 10 which may be part of the armature and is inside the motor engages the lead screw 18 is actually a nut half or first portion of an anti-backlash mechanism as, for example, as shown in our U.S. Pat. Nos. 4,131,031 or RE 32,433.

In this embodiment, the second portion of the anti-backlash mechanism is shown to be outside of the motor housing and is the nut half designated 24. The nut portions are biased away from each other by a spring 26 as described in our two above identified patents. A spacer 28 is also included and its function is also described in our earlier U.S. Pat. No. 4,353,264.

The armature 8 and the shaft 10 and hence the anti-backlash mechanism including the second nut half 24, the spring 26 and the spacer 28 are rotatable as a unit when they are excited by the field 4 and 6.

Thus, as the armature 8 is rotated, either in steps or continuously by the field 4 and 6, the rod 18 advances or withdraws depending upon the direction of rotation. Because of the presence of the anti-backlash mechanism, there is virtually no lost motion between the motor housing and the rod 18 over millions of cycles.

Whereas anti-backlash mechanisms conventionally are stationary members and which are generally attached to elements which are to be driven linearly by rotatable lead screws, the present actuator is just the opposite. The anti-backlash mechanism is fixed to the armature, and is rotatable and the rod, unlike the lead screw moves linearly.

Figure 4:
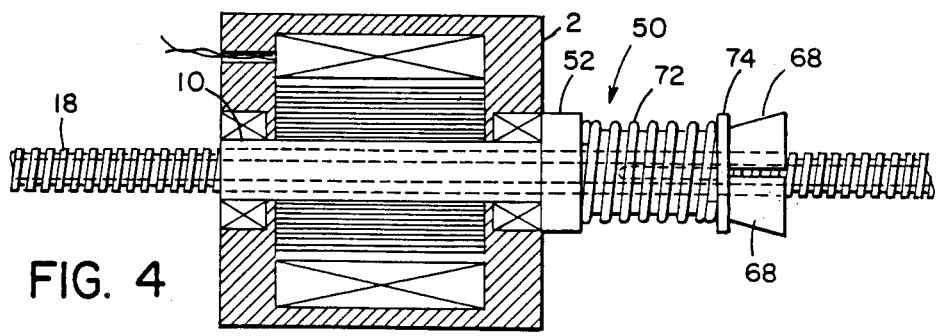
FIGS. 4 and 5 are views similar to FIG. 3 illustrating various forms of anti-backlash mechanisms employed with the motorized linear actuator.
Figure 5:
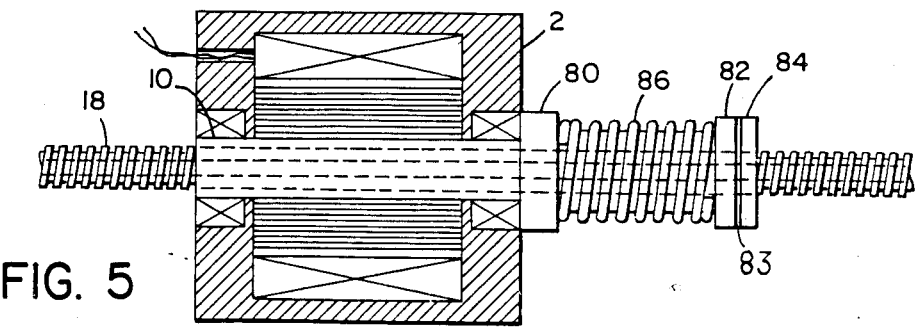

FIGS. 4 and 5 are illustrative of two different anti-backlash mechanisms employed with the present invention. FIG. 4, the motor housing 2 and the threaded rod 18 will be seen as being similar to those shown in FIG. 3. The anti-backlash mechanism is of the type disclosed in our U.S. Pat. No. RE 32, 433 wherein a spring 72 is mounted around anti-backlash nut 50 and held in compression between a face plate 52 and a ring member 74 which is located at the base of ramps 68 and 70 as is taught in the patent. The ring 70 will slide up ramp 68 and 70 as far as possible under the axial force supplied by the spring 72.

In FIG. 5 the anti-backlash mechanism is of the type shown and described in our U.S. Pat. No. 4,353,264, and which includes a face plate 80, spacer means 82, an elastomeric washer 83, a raised shoulder 84 and a torsion spring 86, all as described in the above identified patent.

Suffice it to say, the armature is attached to either half of an anti-backlash nut so that the whole nut mechanism is rotatable with the armature.

We claim:

1. Motorized anti-backlash linear actuator comprising, in combination:

a source of rotary motion comprising a motor;

a hollow armature in the motor mounted for rotation about a central axis;

the armature surrounding a hollow shaft and secured directly thereto to rotate the shaft about the axis;

the hollow shaft being one piece, inwardly threaded along its entire length and extending the entire length of the armature;

frame means mounting the motor for internal rotational movement only at a fixed location in space and preventing its movement lengthwise of the axis;

an externally threaded non-rotating rod extendable from and movable linearly along the axis relative to the fixed location of the motor;

a continuously operating, rotatable anti-backlash nut assembly to produce substantially backlash-free linear motion of the rod lengthwise of the axis, the nut assembly comprising the hollow shaft within the armature and a cooperating spring means outside the motor;

the threads of the hollow shaft and the rod being in direct physical contact;

a field coil surrounding the armature to impart rotary motion to the unit;

the anti-backlash nut assembly being secured to the hollow shaft such that the armature, the shaft and the anti-backlash nut assembly rotate as a unit at the fixed location in space while prevented by the frame from moving linearly;

thereby to impart to the rod non-rotating linear motion lengthwise of the axis relative to the fixed location in space and which motion is substantially backlash-free.

2. Mechanism according to claim 1, wherein at least a portion of the hollow shaft is outside the armature.

3. Mechanism according to claim 1, including a motor housing in which the anti-backlash nut is journaled for rotation.

4. Mechanism according to claim 1, wherein rod is hollow thereby to permit the passage of a fluid therethrough.

* * * * *